US006920443B1

(12) United States Patent
Cesare et al.

(10) Patent No.: US 6,920,443 B1
(45) Date of Patent: Jul. 19, 2005

(54) METHOD, SYSTEM, PROGRAM, AND DATA STRUCTURE FOR TRANSFORMING DATABASE TABLES

(75) Inventors: Mark Anthony Cesare, San Francisco, CA (US); Tom Robert Christopher, Morgan Hill, CA (US); Julie Ann Jerves, Saratoga, CA (US); Richard Henry Mandel, III, San Jose, CA (US)

(73) Assignee: International Business Machines, Corporation, Armonk, NY (US)

( * ) Notice: Subject to any disclaimer, the term of this patent is extended or adjusted under 35 U.S.C. 154(b) by 0 days.

(21) Appl. No.: 09/400,507

(22) Filed: Sep. 21, 1999

(51) Int. Cl.[7] .............................................. G06F 17/30
(52) U.S. Cl. ............................ 707/1; 707/4; 707/104; 709/219
(58) Field of Search .................. 707/1–206, 100–104.1; 709/214–215, 217, 218, 219

(56) References Cited

U.S. PATENT DOCUMENTS

| | | | |
|---|---|---|---|
| 4,876,733 A | 10/1989 | Lavin ........................ | 382/205 |
| 4,930,071 A | 5/1990 | Tou et al. ...................... | 707/4 |
| 5,196,924 A | 3/1993 | Lumelsky et al. ............ | 348/67 |
| 5,282,147 A | 1/1994 | Goetz et al. ................... | 716/2 |
| 5,299,304 A | 3/1994 | Williams et al. ............ | 707/523 |
| 5,321,797 A | 6/1994 | Morton ....................... | 345/604 |
| 5,367,675 A | 11/1994 | Cheng et al. ................. | 707/2 |
| 5,548,749 A | 8/1996 | Kroenke et al. ............ | 707/102 |
| 5,548,754 A | 8/1996 | Pirahesh et al. .............. | 707/2 |
| 5,548,755 A | 8/1996 | Leung et al. ................. | 707/2 |
| 5,548,758 A | 8/1996 | Pirahesh et al. .............. | 707/2 |
| 5,560,005 A | 9/1996 | Hoover et al. ................ | 707/10 |
| 5,584,024 A | 12/1996 | Shwartz ....................... | 707/4 |
| 5,588,150 A | 12/1996 | Lin et al. ...................... | 707/1 |
| 5,590,321 A | 12/1996 | Lin et al. ..................... | 549/349 |
| 5,590,324 A | 12/1996 | Leung et al. ................. | 707/5 |
| 5,598,559 A | 1/1997 | Chaudhuri ................... | 707/2 |
| 5,615,361 A | 3/1997 | Leung et al. ................. | 707/3 |
| 5,687,362 A | 11/1997 | Bhargava et al. ............ | 707/2 |
| 5,694,591 A | 12/1997 | Du et al. ....................... | 707/2 |
| 5,701,454 A | 12/1997 | Bhargava et al. ............ | 707/2 |
| 5,724,570 A | 3/1998 | Zeller et al. .................. | 707/3 |

(Continued)

FOREIGN PATENT DOCUMENTS

| | | |
|---|---|---|
| JP | 7182179 | 7/1995 |
| JP | 7244603 | 9/1995 |
| JP | 8241330 | 9/1996 |
| JP | 9179882 | 7/1997 |
| WO | 9636003 | 11/1996 |

OTHER PUBLICATIONS

International Business Machines Corporation, IBM's.Date Mining Technology, White Paper; Data Management Solutions,(c) 1996.

International Business Machines Corporation, IBM Visual Warehouse for Windows NT, Managing Visual Warehouse, (c) 1998.

IBM Technical Disclosure Bulletin, Efficient Logging of Transactions on Persistent Information tin General and Data bases in Particular, vol. 40,No. 11, Nov. 1997 (c) 1997; pp. 117–120.

(Continued)

*Primary Examiner*—Shahid Alam
*Assistant Examiner*—Jean Bolte Fleurantin
(74) *Attorney, Agent, or Firm*—David W. Victor; Konrad, Raynes & Victor

(57) ABSTRACT

Disclosed is a method, system, program, and data structure for transforming data in an input table in a database in a server in communication with a client. A transform command is received from the client indicating an input data table name in the database and at least one rule indicating at least one cell in the input table to transform and a transform operation to perform with respect to the at least one cell. The transform command is executed in the server including the database by accessing a copy of the input table from the database and transforming data in the accessed input table according to each rule specified in the transform command.

31 Claims, 3 Drawing Sheets

U.S. PATENT DOCUMENTS

| | | | | |
|---|---|---|---|---|
| 5,724,575 | A | | 3/1998 | Hoover et al. .................. 707/10 |
| 5,737,592 | A | | 4/1998 | Nguyen et al. .................. 707/4 |
| 5,742,806 | A | | 4/1998 | Reiner et al. .................... 707/3 |
| 5,765,167 | A | * | 6/1998 | Kiuchi et al. ................ 707/200 |
| 5,903,753 | A | * | 5/1999 | Bramnick et al. ........... 709/328 |
| 5,905,982 | A | | 5/1999 | Carey et al. .................... 707/4 |
| 5,953,534 | A | * | 9/1999 | Romer et al. ................ 717/138 |
| 6,298,342 | B1 | * | 10/2001 | Graefe et al. ................... 707/4 |
| 6,370,524 | B1 | * | 4/2002 | Witkowski ...................... 707/3 |
| 6,604,095 | B1 | * | 8/2003 | Cesare et al. .................... 707/1 |
| 6,748,389 | B1 | * | 6/2004 | Cesare et al. ................ 707/100 |

OTHER PUBLICATIONS

IBM Technical Disclosure Bulletin, Transformation of an Entity–Relationship Model into a System Object Model, Nov., 1994, pp. 631–634.

IBM Technical Disclosure Bulletin, Branch Set Preserving Transformations of Hierarchical Data Structure, vol. 23, No. 7B, Dec. 1980, (c) 1980; pp. 3090–3094.

IBM Technical Disclosure Bulletin, Intelligent Miner, vol. 40, No. 02, Feb., 1997; pp. 121–125.

*Design and Implementation of Derivation Rules in Information Systems*, by R. Winter. Data & Knowledge Engineering, vol. 26, (1998), pp. 225–241.

*Realizing Object–Relational Databases by Mixing Tables with Objects.*, by C. Liu, et al. CRC for Distributed Systems Technology, School of Information Technology, The University of Queensland, Brisbane, Australia, pp. 335–346.

*SuperSQL: An Extended SQL for Database Publishing and Presentation.*, by M. Toyama. Department of Information and Computer Science, Keio University, Yokohama, JP, pp. 584–586.

*A Starburst is Born*, by G. Lapis, et al. IBM Almaden Research Center, San Jose, CA. 1 page.

*Datalog Rule Evaluation in Associative Computers and Massively Parallel SIMD Machines*, by O. Cho, et al. Department of Computer Science, The University of Queensland, Brisbane, Australia, pp. 56–.

*Framework for Query Optimization in Distributed Statistical Databases*, by Sadreddini, M.H., et al. Information and Software Technology, vol. 34, No. 6, Jun. 1992, pp. 363–377.

ACM, 1983. Incomplete Information and Dependencies in Relational Databases* (*Preliminary Version), by T. Imielinski. Sigmod Record Issue Vo. 13, No. 4, pp. 178–184.

*Abstraction in Query Processing*, by T. Imielinski. Journal of the Association for Computing, vol. 38, No. 3, Jul. 1991, pp. 534–558.

* cited by examiner

METHOD, SYSTEM, PROGRAM, AND DATA STRUCTURE FOR TRANSFORMING DATABASE TABLES

CROSS-REFERENCE TO RELATED APPLICATIONS

This application is related to the following co-pending and commonly-assigned patent applications, all of which are filed on the same date herewith, and which are incorporated herein by reference in their entirety:

"Method, System, Program, And Data Structure for Pivoting Columns in a Database Table," to Mark A. Cesare, Julie A. Jerves, and Richard H. Mandel III, and having U.S. application Ser. No. 09/400,507;

"Method, System, Program, and Data Structure for Cleaning a Database Table," to Mark A. Cesare, Tom R. Christopher, Julie A. Jerves, Richard H. Mandel III, and having U.S. application Ser. No. 09/399,694;

"Method, System, and Program for Inverting Columns in a Database Table," to Mark A. Cesare, Julie A. Jerves, and Richard H. Mandel III, and having U.S. application Ser. No. 09/400,690; and "Method, System, Program, And Data Structure For Cleaning a Database Table Using a Look-up Table," Mark A. Cesare, Julie A. Jerves, and Richard H. Mandel III, and U.S. application Ser. No. 09/401,006.

BACKGROUND OF THE INVENTION

1. Field of the Invention

The present invention relates to a method, system, program, and data structure for transforming a database table.

2. Description of the Related Art

Data records in a computer database are maintained in tables, which are a collection of rows all having the same columns. Each column maintains information on a particular type of data for the data records which comprise the rows. A data warehouse is a large scale database including millions or billions of records defining business or other types of transactions or activities. Data warehouses contain a wide variety of data that present a coherent picture of business or organizational conditions over time. Various data analysis and mining tools are provided with the data warehouse to allow users to effectively analyze, manage and access large-scale databases to support management decision making. Data mining is the process of extracting valid and previously unknown information from large databases and using it to make crucial business decisions. In many real-world domains such as marketing analysis, financial analysis, fraud detection, etc, information extraction requires the cooperative use of several data mining operations and techniques.

Once the desired database tables have been selected and the data to be mined has been identified, transformations on the data may be necessary. Transformations vary from conversions of one type of data to another, e.g., converting nominal values into numeric ones so that they can be processed by a neural network, to definition of new attributes, i.e., derived attributes. New attributes are defined either by applying mathematical or logical operators on the values of one or more database attributes. The transformed data is stored in a target database where it may then be mined using one or more techniques to extract the desired type of information necessary to make the organizational decisions. Further details of data mining are described in the International Business Machines Corporation (IBM) publication entitled "White Paper: Data Mining Solutions" (IBM Copyright, 1996)

Data transformation refers to the process of filtering, merging, decoding, and translating source data to create validated data for the data warehouse and data mining tools. For example, a numeric regional code might be replaced with the name of the region. Data transformations are used when data is inconsistent or incompatible between sources. Some of the current techniques for transforming data include the use of an SQL WHERE clause to limit the rows extracted from the source table. Further, formulas and expressions specified in the column definition window and constants and tokens are used to eliminate and modify data. Previous versions of IBM Visual Warehouse included programs to allow users to perform numerous functions on the source data. For instance, if one database table has revenue data in U.S. dollars and another data table stores revenue data in foreign currency denominations, then the foreign revenue data must be cleansed before both sets of data can be analyzed together. Transformation operations may be performed using client application programs external to the database program that process and transform tables of data records. Further details of data warehousing and data transforms, are described in the IBM publications "Managing Visual Warehouse, Version 3.1," IBM document no. GC26-8822-01 (IBM Copyright, January, 1998), which is incorporated herein by reference in its entirety.

Current implementations of transform operations require writing a specific application to implement a transform operation. Thus, different transform application programs must be written for each table to transform and for different transform rules applied to the same table. Further, in current implementations, the data in the database table is transferred from the database server to the client to perform the transformation operation on the data at the client. After the data is transformed at the client, the data must then be transferred to the database server to update the transformed table in the database. This process of transferring the data from the database between the client and server consumes substantial network bandwidth and server and client processing cycles. Moreover, with very large tables, comprising numerous columns and possibly millions or billions of records, the table is sometimes processed in parts, i.e., on a column-by-column basis. Thus, with current transform techniques, data is read and written between the client and database server over the network numerous times to accomplish the transformation of the data.

Thus, there is a need in the art to provide an improved technique for transforming data in a database server.

SUMMARY OF THE PREFERRED EMBODIMENTS

To overcome the limitations in the prior art described above, preferred embodiments disclose a method, system, program, and data structure for transforming data in an input table in a database in a server in communication with a client. A transform command is received from the client indicating an input data table name in the database and at least one rule indicating at least one cell in the input table to transform and a transform operation to perform with respect to the at least one cell. The transform command is executed in the server including the database by accessing a copy of the input table from the database and transforming data in the accessed input table according to each rule specified in the transform command.

In further embodiments, the client is a client computer that communicates with the server over a network such that the transform command is transmitted from the client computer to the server over the network. Alternatively, the client can comprise an application program executing in the server.

In still further embodiments, the transform command rules specify multiple transform operations to perform on at least one cell in the accessed input table such that an application of a subsequent transform operation following a previous transform operation on one cell transforms previously transformed data in the cell.

In yet further embodiments, the transformed input table data is written to the database in the server after performing all transform operations specified in the rules of the transform command against the accessed input table.

Preferred embodiments provide a flexible and programmable data structure and program to provide fine grained control of transform operations. Further, with preferred embodiments, execution of the transform command does not increase network traffic because database tables are not transferred between the client and server over a network. Instead, the client provides a command data structure including various parameters and rules to a stored procedure that executes in the server to perform the transform operations within the database program on the server. Such savings in network traffic can be significant when very large database tables, including millions or billions of records are transformed.

Moreover, the preferred transform command structure allows the execution of multiple transform operations on the input table in a single pass without having to transfer data between the database and the client. Instead, with preferred embodiments, after all data is transformed, the transformed data is then written to the database.

BRIEF DESCRIPTION OF THE DRAWINGS

Referring now to the drawings in which like reference numbers represent corresponding parts throughout.

DETAILED DESCRIPTION OF THE
PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Computing Environment

Figure 1:
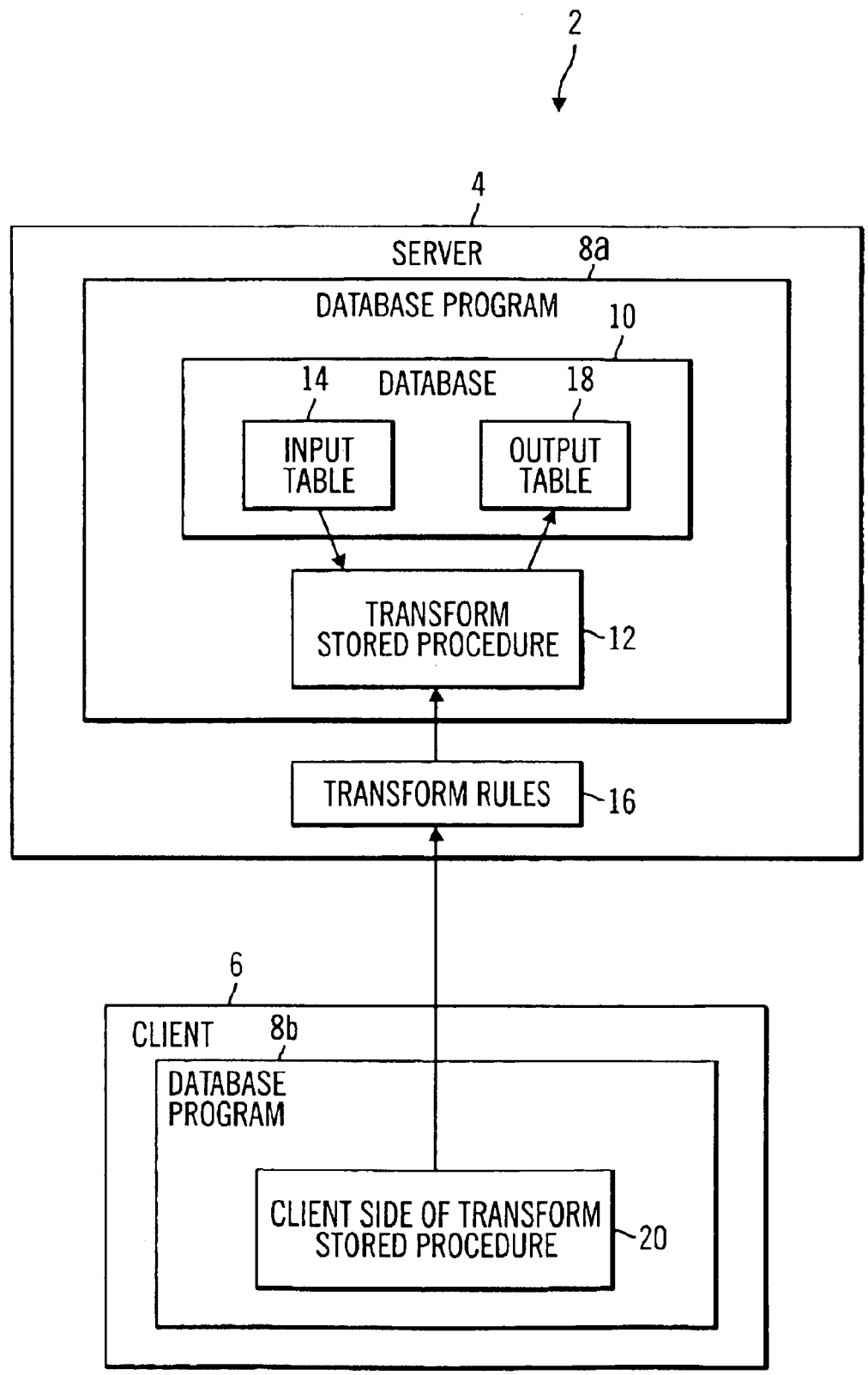
FIG. 1 illustrates a computing environment in which preferred embodiments are implemented.

FIG. 1 illustrates a computing environment 2 in which preferred embodiments are implemented. The environment 2 includes a server 4 and client 6. The server 4 and client 6 would include an operating system, such as MICROSOFT WINDOWS 98 and WINDOWS NT, AIX, OS/390, OS/400, OS/2, and SUN SOLARIS,** and may be comprised of any suitable server and client architecture known in the art. The server 4 and client 6 include a database program 8a and 8b, wherein 8a comprises the server 4 side of the database program and 8b comprises the client 6 side. The server 4 and client 6 may communicate via any communication means known in the art, such as a telephone line, dedicated cable or network line, etc, using any protocol known in the art including TCP/IP network (e.g., an Intranet, the Internet), LAN, Ethernet, WAN, System Area Network (SAN), Token Ring, etc. Alternatively, there may be separate and different networks between the servers 4 and client 6.

The client/server database programs 8a, b, may be comprised of any client/server database program known in the art, such as DB2, Oracle Corporation's ORACLE 8, Microsoft SQL Server,** etc. The database programs 8a and 8b are used to access operations and perform operations with respect to information maintained in one or more databases 10. The database(s) 10 would consist of multiple tables having rows and columns of data, e.g., tables 14 and 18. Further details of the architecture and operation of a database program are described in the IBM publications "DB2 for OS/390: Administration Guide, Version 5" IBM document no. SC26-8957-01 (Copyright IBM. Corp., June, 1997) and "A Complete Guide to DB2 Universal Database," by Don Chamberlin (1998), which publications are incorporated herein by reference in its entirety.

**Microsoft, Windows, Windows NT are registered trademarks and Microsoft SQL Server is a trademark of Microsoft Corporation; DB2, AIX, OS/390, OS/400, and OS/2 are registered trademarks of IBM; and Oracle 8 is a trademark of Oracle Corporation; and Solaris is a trademark of Sun Microsystem, Inc.

In preferred embodiments, the transform program is implemented using the IBM stored procedure database program structure. A stored procedure is a block of procedural constructs and embedded SQL statements, i.e., an application program, that is stored in a database and can be called by name. Stored procedures allow an application program to execute in two parts. One part runs on the client and the other on the server. This allows one client call to produce several accesses of the database from the application program executing on the system, i.e., server including the database. Stored procedures are particularly useful to process a large number of database records, e.g., millions to billions of records, without having to transfer data between the server 4 and client 6. The client stored procedure passes input information to the server stored procedure which then, executing within the database program 8 including the database 10, processes numerous database records according to such client input information. The server stored procedure program is initiated by the client, and during execution the client cannot communicate with the stored procedure executing in the server. Further details of stored procedures are described in the publication "A Complete Guide to DB2 Universal Database," "A Complete Guide to DB2 Universal Database," which was incorporated by reference above.

The transform of the preferred embodiments is implemented as a stored procedure application program 12 in the server 4. The transform stored procedure 12 receives as input a name of an input table 14 in the database 10, and transform rules 16 from the client 6 specifying the transform operations to perform on the data in the named input table 14. The results of the transform operations performed by the transform stored procedure 12 processing the transform rules 16 are generated into the output table 18. Alternatively, the transformed input table is written to the database 10 to overwrite the previous version of the input table 14.

The client side of the transform stored procedure 20 generates the transform rules 16 that specify the transform operations to perform and initiate execution of the transform stored procedure 12. The rules specified by the client side 20 are capable of performing any data transformation known in the art.

In preferred embodiments, the client side 8b can pass parameters to the transform stored procedure as "host variables" or embedded in a CALL statement. In either case, the parameters or transform rules 16 must be specified to control the operation of the transform 12.

Structure and Operation of the Transform Rules

Figure 2:
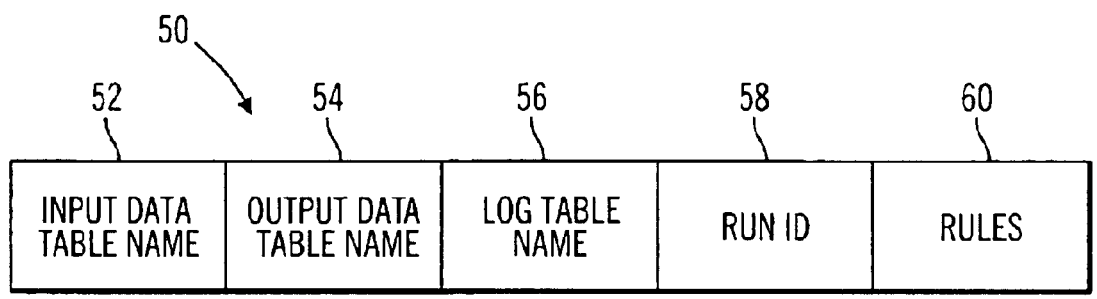
FIG. 2 illustrates the parameters used in a transform command to clean input tables in accordance with preferred embodiments of the present invention.

A graphical user interface (GUI) at the client 6 may be used to enter various input parameters to control a transform operation. In response to such user input, the client side 20 would generate an application program interface (API) call to the transform stored procedure 12 including the parameters shown in FIG. 2 to initiate and control the operation of the transform stored procedure 12. The parameter field 50 shown in FIG. 2 includes an input table name 52, output table name 54, log table name 56, run ID 58, and rules 60.

The input table name 52 specifies the input table 14 table including the data subject to the transform operations and the output table name 54, which is optional, specifies the output table 18 where the transformed data from the input table 14 is stored. The log table name 56 indicates the name of a log file into which warnings and exceptions that occur during execution of the clean transform stored procedure 12 are stored. The run ID 58 appears in the log file and is used to identify the transform operations for which the log entry was made. The rules 60 provide specific instructions on how to process cells in the input table 14 to produce the output.

In preferred embodiments, in addition to specifying operations to perform, the rules also specify the columns and/or rows in the input table 14 to which the rules apply. Each rule further specifies particular transform operations to perform on the columns or cells identified in the rule. These transform operations involve processing and modifying the value or transforming the structure of the input table 14 to a new column/row table structure in the output table. Separate rules may be provided for different columns. In further embodiments, the rules may comprise a table of rules. In such case, the rules 60 parameter would specify which rules in the rules table to apply to a particular column in the input table 14 to affect the transform operation. Still further, the rules may sequentially perform different operations on the same cell. In this way, cells in the input table 14 may be modified in sequence and processed according to transform operations specified in different rules. The rules may comprise straightforward conversions of data, e.g., aggregations to supply weekly or monthly data, or involve complex statistical algorithms which operate on more than one cell of the data.

In preferred embodiments, the rules may comprise multiple fields in the parameter list according to a specified format. Preferred embodiments allow the same rule structure to apply to different input tables, thereby allowing the user to select among transform operations to specify in the transform command and an input table to transform. For instance, the rules for a clean operation would specify input columns and rules to apply in the input columns to clean or modify the data.

Figure 3:
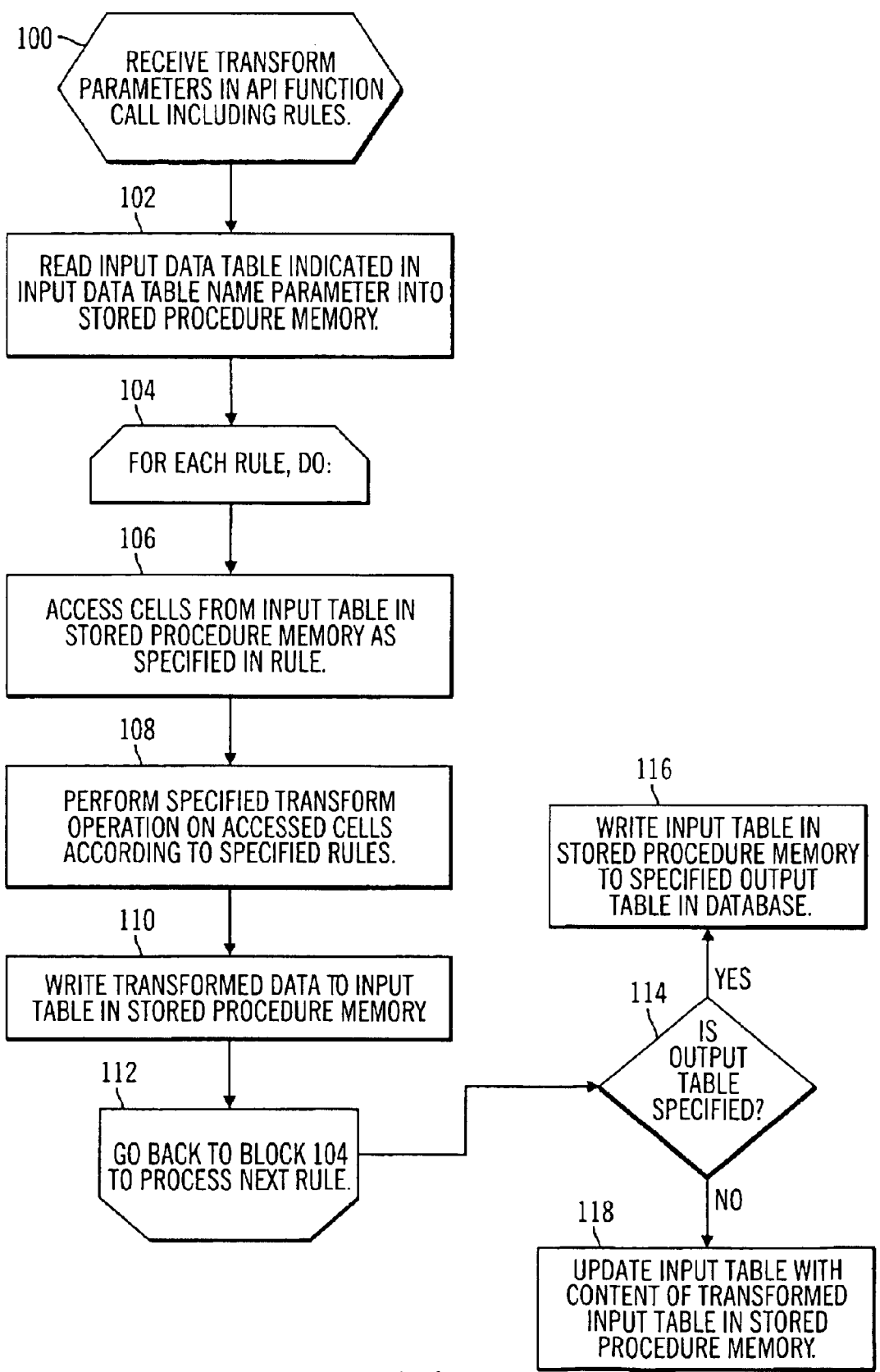
FIG. 3 illustrates logic to transform an input data table in accordance with preferred embodiments of the present invention.

FIG. 3 illustrates logic implemented in the transform stored procedure 12 (transform 12) to process cells in the input table 18 according to the parameters 50 and rules 60. These parameters 50 and any further sub-parameters within comprise the transform rules 16. As discussed, a user at the client 6 would specify certain transform operations to perform on the input table 18 and the client side of the transform 20 would generate an API function call including the transform parameters 50 from information the user entered in the GUI. Control begins at block 100 with the transform 12 receiving the transform parameters 50 in an API function call. The transform 12 reads (at block 102) the input table 14 from the database 10 indicated in the input data table name 52 into a memory area used by the transform stored procedure 12. For each rule 60 specified in the parameter list 50, the transform 12 executes a loop (at block 104) to perform operations for each rule to transform certain cells of the input table according to the operations specified in the rules. Within this loop, the transform 12 starts by accessing cells from the input table in the stored procedure 12 memory as specified in the rule. As discussed, in preferred embodiments, the rule specifies an operation to perform and cells in the input table 14 to operate upon. The input table 14 cells subject to the current rule may have been specified in a previous rule.

The transform 12 then performs (at block 108) the transform operation specified in the rules on the accessed cells from the input table. The transform 12 then writes (at block 110) the transformed cells to the input table in the stored procedure 12 memory. The transform 12 proceeds (at block 112) to loop back to block 104 if there are further transform rules to apply against the input table 14. After processing all the rules provided in the transform command, the transform 12 determines (at block 114) whether an output table was specified in the transform rules 16, i.e., parameters. If so, then the transform writes the input table in the stored procedure 12 memory to the specified output table in the database 10. Otherwise, the input table 14 in the database 10 is updated (at block 118) with the content of the transformed input table in the stored procedure memory.

Preferred embodiments provide a command data structure to control a stored procedure program to transform columns or cells in an input table 14 in the database 10. The rules may be similar to the rules described in the co-pending and commonly assigned patent applications, incorporated by reference above. Preferred embodiments allow one or more transform rules to transform the cells in an input table in a single pass, before the transformed data is written back to the database. A single instance of execution of the transform program can perform numerous types of operations on the cells of the input table.

Moreover, with the preferred embodiments no data from the input table needs to be transferred to the client to perform the transform operations, as the transform operations are performed in a stored procedure program executing in the database server 4. This substantially improves processing times as there are no delays to transfer the database table data to the client for processing. This is especially significant in a large scale database table which may comprise numerous columns and millions or billions of rows. With preferred embodiments, the transform operations are performed local to the database 10, thereby avoiding the time and network bandwidth needed to transfer database data to the client for transformations.

Moreover, with preferred embodiments, a set of transfer operations, as specified in the rules, may be applied in a single pass to the copy of the input table maintained in the stored procedure memory. This avoids the need to continually read and write to the database 10 during the transformation process. With preferred embodiments, data is only read and written once to the database; data is read once to place the input table in the stored procedure memory and written once to update the database 10 with the transformed input table.

Still further, preferred embodiments provide a parameterized, command based structure to define transform operations on any given input table. Thus, with preferred embodiments, rules may be applied over-and-over without the need of having to write a separate transform application program, such as a Visual basic program, for each transform operation to perform. Instead, a command is built including the appropriate parameters to perform the desired transform operations.

CONCLUSION

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

Preferred embodiments are applicable to any type of transform operation known in the art, including the transform operations described in the co-pending and commonly assigned patent applications, incorporated by reference above. In further embodiments, other types of rules may be provided and included in the command data structure of the preferred embodiments to perform different types of operations known in the art.

In preferred embodiments, the transform program was executed in a stored procedure type program, such as that used in the IBM DB2 database system. However, in further embodiments, different types of application programs, other than stored procedure programs, may be executed in the server 4 to perform operations in accordance with the command data structures of the preferred embodiments.

Preferred embodiments were described with respect to the transform commands created and transmitted at a client computer that is separate from the server. In alternative embodiments, the client may comprise a client application program executing in the server that generates transform commands for transmittal to the transform stored procedure. In this way, the client and transform stored procedure may execute and communicate through the same server machine.

In preferred embodiments, the input table and output table were included in a database in the server in which the transform stored procedure program is executing. In alternative embodiments, the rule, input, and output tables may be distributed at different storage locations at different network devices.

In preferred embodiments, a client constructed the transform command and communicated the command to the database server. In alternative embodiments, the transform command of the preferred embodiments may be executed on the machine used to construct the command.

In summary, preferred embodiments disclose a method, system, program, and data structure for transforming data in an input table in a database in a server in communication with a client. A transform command is received from the client indicating an input data table name in the database and at least one rule indicating at least one cell in the input table to transform and a transform operation to perform with respect to the at least one cell. The transform command is executed in the server including the database by accessing a copy of the input table from the database and transforming data in the accessed input table according to each rule specified in the transform command.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for transforming data in an input table in a database in a server in communication with a client, comprising:

receiving from the client a transform command indicating an input data table name in the database and at least one rule indicating at least one cell in the input table to transform and a transform operation to perform with respect to the at least one cell;

accessing a copy of the input table from the database; and transforming, within the server, data in the accessed input table according to each rule specified in the transform command.

2. The method of claim 1, wherein the client is a client computer that communicates with the server over a network, wherein the transform command is transmitted from the client computer to the server over the network.

3. The method of claim 1, wherein the client is an application program executing in the server.

4. The method of claim 1, wherein the transform command rules specify multiple transform operations to perform on at least one cell in the accessed input table, wherein an application of a subsequent transform operation following a previous transform operation on one cell transforms previously transformed data in the cell.

5. The method of claim 1, wherein the client cannot affect the execution of the transform command during the execution of the transform command, whereby the transform command executes in the server independently of the client.

6. The method of claim 1, wherein the transform command further comprises multiple rules, wherein each rule specifies at least one column in the input table and at least one transform operation to perform on each specified column in the input table, wherein at least two rules specify different columns in the input table and different transform operations to apply to each specified column.

7. The method of claim 1, wherein the transform operation modifies the content of the at least one cell.

8. A method for transforming data in an input table in a database in a server in communication with a client, comprising:

receiving from the client a transform command indicating an input data table name in the database and at least one rule indicating at least one cell in the input table to transform and a transform operation to perform with respect to the at least one cell;

accessing a copy of the input table from the database;

transforming, within the server, data in the accessed input table according to each rule specified in the transform command; and writing the transformed input table data to the database in the server after performing all transform operations specified in the rules of the transform command against the accessed input table.

9. The method of claim 8, further comprising:

determining whether the transform command indicates an output table in the database;

writing the transformed input table to the output table if the transform command indicates the output table; and updating the input table in the database with the transformed input table if the transform command does not indicate one output table.

10. A system for transforming data, comprising:

a client process;

a server including a database and an input table in communication with the client process;

program logic implemented in the server, comprising:
  (i) means for receiving from the client process a transform command indicating an input data table name in the database and at least one rule indicating at least one cell in the input table to transform and a transform operation to perform with respect to the at least one cell;
  (ii) means for accessing a copy of the input table from the database; and
  (iii) means for transforming data in the accessed input table according to each rule specified in the transform command.

11. The system of claim 10, wherein the client process executes in a client computer that communicates with the server over a network, wherein the transform command is transmitted from the client computer to the server over the network.

12. The system of claim 10, wherein the client process is an application program executing in the server.

13. The system of claim 10, wherein the transform command rules specify multiple transform operations to perform on at least one cell in the accessed input table, wherein an application of a subsequent transform operation following a previous transform operation on one cell transforms previously transformed data in the cell.

14. The system of claim 10, wherein the client process cannot affect the execution of the transform command curing the execution of the transform command, whereby the transform command executes in the server independently of the client process.

15. The system of claim 10, wherein the transform command further comprises multiple rules, wherein each rule specifies at least one column in the input table and at least one transform operation to perform on each specified column in the input table, wherein at least two rules specify different columns in the input table and different transform operations to apply to each specified column.

16. The system of claim 10, wherein the transform operation modifies the content of the at least one cell.

17. A system for transforming data, comprising:

a client process;

a server including a database and an input table in communication with the client process;

program logic implemented in the server, comprising:
  (i) means for receiving from the client process a transform command indicating an input data table name in the database and at least one rule indicating at least one cell in the input table to transform and a transform operation to perform with respect to the at least one cell;
  (ii) means for accessing a copy of the input table from the database;
  (iii) means for transforming data in the accessed input table according to each rule specified in the transform command; and
  (iv) means for writing the transformed input table data to the database in the server after performing all transform operations specified in the rules of the transform command against the accessed input table.

18. The system of claim 17, wherein the program logic further comprises:

means for determining whether the transform command indicates an output table in the database;

means for writing the transformed input table to the output table if the transform command indicates the output table; and means for updating the input table in the database with the transformed input table if the transform command does not indicate one output table.

19. An article of manufacture for use in transforming data in an input table in a database, the article of manufacture comprising computer usable media including at least one computer program embedded therein that causes the computer to perform:

receiving a transform command indicating an input data table name in the database and at least one rule indicating at least one cell in the input table to transform and a transform operation to perform with respect to the at least one cell;

accessing a copy of the input table from the database; and transforming data in the accessed input table according to each rule specified in the transform command.

20. The article of manufacture of claim 19, wherein the transform command rules specify multiple transform operations to perform on at least one cell in the accessed input table, wherein an application of a subsequent transform operation following a previous transform operation on one cell transforms previously transformed data in the cell.

21. The article of manufacture of claim 19, wherein the transform command further comprises multiple rules, wherein each rule specifies at least one column in the input table and at least one transform operation to perform on each specified column in the input table, wherein at least two rules specify different columns in the input table and different transform operations to apply to each specified column.

22. The method of claim 19, wherein the client cannot affect the execution of the transform command during the execution of the transform command, whereby the transform command executes in the server independently of the client.

23. The article of manufacture of claim 19, wherein the transform operation modifies the content of the at least one cell.

24. An article of manufacture for use in transforming data in an input table in a database, the article of manufacture comprising computer usable media including at least one computer program embedded therein that causes the computer to perform:

receiving a transform command indicating an input data table name in the database and at least one rule indicating at least one cell in the input table to transform and a transform operation to perform with respect to the at least one cell;

accessing a copy of the input table from the database;

transforming data in the accessed input table according to each rule specified in the transform command; and writing the transformed input table data to the database after performing all transform operations specified in the rules of the transform command against the accessed input table.

25. The article of manufacture of claim 24, further comprising:

determining whether the transform command indicates an output table in the database;

writing the transformed input table to the output table if the transform command indicates the output table; and updating the input table in the database with the transformed input table if the transform command does not indicate one output table.

26. A memory device including a command for performing a transform operation on a computer database input table, the command comprising an input data table name parameter indicating the input table subject to the transform operation; and at least one rule indicating at least one cell in the input table to transform and a transform operation to perform with respect to the at least one cell, wherein the transform command is executed to access a copy of the input table from the database and transforming data in the accessed input table according to each rule specified in the transform command, wherein the command is transmitted from a client to a server, and wherein the server processes the command to transform data in the input table according to each rule in the transform command.

27. The memory of claim 26, wherein the transform command rules specify multiple transform operations to perform on at least one cell in the accessed input table, wherein an application of a subsequent transform operation following a previous transform operation on one cell transforms previously transformed data in the cell.

28. The memory of claim 26, wherein the transform command is capable of indicating an output table in the database, wherein the transformed input table is written to the output table if the transform command indicates the output table, and wherein the input table in the database is updated with the transformed input table if the transform command does not indicate one output table.

29. The memory of claim 26, wherein the transform command further comprises multiple rules, wherein each rule specifies at least one column in the input table and at least one transform operation to perform on each specified column in the input table, wherein at least two rules specify different columns in the input table and different transform operations to apply to each specified column.

30. The memory device of claim 26, wherein the transform operation modifies the content of the at least one cell.

31. A memory device including a command for performing a transform operation on a computer database input table, the command comprising an input data table name parameter indicating the input table subject to the transform operation; and at least one rule indicating at least one cell in the input table to transform and a transform operation to perform with respect to the at least one cell, wherein the transform command is executed to access a copy of the input table from the database and transforming data in the accessed input table according to each rule specified in the transform command, wherein the transformed input table data is written to the database in the server after performing all transform operations specified in the rules of the transform command against the accessed input table.

* * * * *